(12) United States Patent
Kogure et al.

(10) Patent No.: US 7,265,295 B2
(45) Date of Patent: Sep. 4, 2007

(54) CONTINUOUS ELECTRIC POWER SUPPLY DEVICE

(75) Inventors: Naoto Kogure, Shizuoka (JP); Gaku Ito, Shizuoka (JP); Norio Watanabe, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/954,284

(22) Filed: Oct. 1, 2004

(65) Prior Publication Data

US 2005/0092512 A1 May 5, 2005

(30) Foreign Application Priority Data

Oct. 29, 2003 (JP) .............................. 2003-368750

(51) Int. Cl.
*H01B 7/00* (2006.01)
*H02G 3/04* (2006.01)

(52) U.S. Cl. ..................... 174/72 A; 174/135; 174/68.1

(58) Field of Classification Search ............... 174/68.1, 174/68.3, 72 A, 97–99 R, 135; 191/22 R, 191/23 R; 248/629; 296/149, 152, 155
See application file for complete search history.

(56) References Cited

U.S. PATENT DOCUMENTS

| | | | | |
|---|---|---|---|---|
| 5,957,702 A * | 9/1999 | Nagai et al. ................... | 439/34 |
| 5,994,645 A * | 11/1999 | Suzuki et al. .................. | 174/72 |
| 6,107,570 A * | 8/2000 | Suzuki et al. .................. | 174/72 |
| 6,494,523 B2 * | 12/2002 | Kobayashi ................... | 296/155 |
| 6,515,229 B2 * | 2/2003 | Aoki et al. .................... | 174/72 |
| 6,566,603 B2 * | 5/2003 | Doshita et al. ................ | 174/72 |
| 6,575,760 B2 * | 6/2003 | Doshita et al. ............ | 174/72 A |
| 6,603,076 B2 * | 8/2003 | Doshita et al. ............ | 174/72 A |
| 6,723,923 B2 * | 4/2004 | Tsukamoto ................ | 174/68.1 |
| 6,791,032 B2 * | 9/2004 | Doshita et al. .............. | 174/135 |
| 6,818,827 B2 * | 11/2004 | Kato et al. ................ | 174/72 A |
| 6,903,274 B2 * | 6/2005 | Aoki et al. .................... | 174/72 |
| 6,919,511 B2 * | 7/2005 | Tsunoda et al. ............... | 174/72 |
| 7,042,738 B2 * | 5/2006 | Tsubaki ....................... | 174/72 |

FOREIGN PATENT DOCUMENTS

| | | |
|---|---|---|
| DE | 101 18 205 A1 | 10/2001 |
| EP | 0 855 312 A2 | 7/1998 |
| JP | 2001-128348 | 5/2001 |
| JP | 2001-354085 | 12/2001 |
| JP | 2004098931 A * | 4/2004 |

* cited by examiner

*Primary Examiner*—Angel R. Estrada
(74) *Attorney, Agent, or Firm*—Armstrong, Kratz, Quintos, Hanson & Brooks, LLP

(57) ABSTRACT

For miniaturizing a power supply structure to absorb slack of a wire harness and improving bending durability, a continuous electric power supply device 1 includes a wire harness 3 formed to have a loop portion 4, an elastic member 6 along the loop portion 4, the elastic member energizing the loop portion to expand in a radial direction. The loop portion 4 and the elastic member 6 are disposed in a protector 2. The protector has a opening 13 for leading the harness and a guide portion 7 for supporting the loop portion 4 at a position opposite to the opening 13. The elastic member, flat spring 6 can have a length forming a loop shape to intersect itself.

16 Claims, 14 Drawing Sheets

CONTINUOUS ELECTRIC POWER SUPPLY DEVICE

The priority application Number Japan Patent Application Laid Open 2003-368750 upon which this patent application is based is hereby incorporated by reference.

BACKGROUND OF THE INVENTION

1. Field of the Invention

This invention relates to a continuous electric power supply device that absorbs slack of a wire harness on opening and closing a slide structure by loading the wire harness with an elastic member in a protector.

2. Description of the Related Art

FIG. 19–20 show one embodiment of a continuous electric power supply device by prior art (see Patent reference 1).

The continuous electric power supply device 60 applied for a slide door 61 of a vehicle includes a synthetic resin protector 62 and a metallic flat spring 64 disposed to rise from bottom to top in the protector 62. The continuous electric power supply device 60 prevents slack of a wire harness 63 by loading the wire harness 63 upwardly with the flat spring 64. The protector is provided with a base and a cover that is omitted in the figures.

One end of the wire harness 63 is led from the protector 62 into the slide door 61 to be connected with an electric device or an auxiliary device, such as a motor for a power regulated window, a door lock unit and an automatic opening/closing door unit. The other end of the wire harness 63 is led through a traversing space 66 to a vehicle body 67 and connected with a power supply.

In the completely closed slide door 61 of FIG. 19, the wire harness 63 is pulled backwardly against the spring load. In the near full opened slide door 61 of FIG. 20, the wire harness 63 is pulled forwardly against the spring load. Though the wire harness 63 intends to be slacked largely in the partially opened slide door 61, the wire harness 63 is received in curved form into the protector 62 by a restoring force of the flat spring 64. Thereby, clamping the slack of the wire harness between the traversing space 66 is prevented.

FIG. 21 shows the other embodiment of a continuous electric power supply device by prior art (see Patent reference 2).

The continuous electric power supply device 70 applied for a slide door of a vehicle includes a synthetic resin protector 71 and a flat wire harness 72 being received to be formed into an S-shape in the protector 71. And respective curved portions of the wire harness 72 are supported slidably by a pair of rollers 73, 74.

One roller 73 is pivoted by the protector 71, and the other roller 74 is movable along an oval guide hole 75 of the protector 71. When the protector 71 is disposed in the slide door, the other roller 74 supported by a pin 76 of the vehicle body moves in an opening/closing direction of slide door, so that the wire harness 72 is led from an opening 77 of the protector 71.

References are following:

Reference 1: Japan Patent Application Laid open 2001-354085, page 7–9, FIG. 4–7; and Reference 2: Japan Patent Application Laid open 2001-128348.

Objects to be Solved

However, the aforesaid continuous electric power supply device of FIG. 19 may be increased in height for receiving the wire harness 63 in a half circle shape in the protector 62. Therefore, a large room for receiving may be required in the slide door 61.

The aforesaid continuous electric power supply device of FIG. 21 forms the wire harness 72 with a small radius along the two rollers 73, 74. Thereby, when using a usual round wire harness instead of the flat wire harness 72, sliding friction between the roller 74 and a wire harness is increased, so that absorbing slack of the wire harness cannot be done smoothly. A large bending stress is loaded on the wire harness, so that the wire harness would have time-dependent wear and damage.

To overcome the above drawback, an object of this invention is to provide a continuous electric power supply device that can miniaturize a device structure such as a protector, and absorb slack of a wire harness smoothly, and increase bending durability of the wire harness.

How to Attain the Object

In order to attain the object, a continuous electric power supply device according to the present invention includes a wire harness being formed into a loop shape and an elastic member being disposed along a loop portion of the wire harness. The elastic member energizes the loop portion in an expansive radial direction.

According to the power supply device mentioned above, when the wire harness is pulled in accordance with open/close of the slide structure, the elastic member is shrunk in the radial direction integrally together with the loop portion of the wire harness and loads elastically the loop portion to be expanded in the radial direction. When the slide structure is partially opened, the wire harness intends to be slacked much, but the loop portion is expanded in the radial direction by a restoring force of the elastic member and the slack is absorbed.

The elastic member is always touching or contacting with the loop portion partially or throughout the length. Thus, the elastic member supports the loop portion by the whole length, so that the loop portion is maintained always in round or near round shape. Thereby, the wire harness does not have a partial stress, and the slack can be absorbed smoothly, and the bending durability of the wire harness is improved. The wire harness is formed in a loop shape, so that the power supply device is miniaturized in comparison with usual curved forming.

The continuous electric power supply device is further specified in the above device by that the loop portion and the elastic member are disposed in a protector.

According to the device mentioned above, the loop portion of the wire harness is protected from interference with outside by the protector. The loop portion can be expanded effectively in a space of the protector, so that the protector can be miniaturized.

The continuous electric power supply device is further specified in the above device by that the protector includes an opening for leading out the wire harness and a guide portion for supporting the loop portion disposed at an opposite side of the opening.

According to the device mentioned above, the wire harness is led from the opening of the protector, and the loop portion of the wire harness is shrunk together with the elastic member in the radial direction at a support point of the guide portion. When the loop portion is expanded in the radial direction, the loop portion is supported at the guide portion without slack. The guide portion ensures to maintain the loop portion in round shape and assures the minimum curved radius to control bending form.

The continuous electric power supply device is further specified in the above device by that the protector is provided with a guide wall separating the loop portion and a harness portion continued to the loop portion.

According to the device mentioned above, the guide wall separates the loop portion and a portion at lead-out side of the wire harness. Thereby, when pulling the wire harness out and drawing the wire harness in, wear between the loop portion and the portion at lead-out side, and wear between the elastic member at the loop portion and the portion at lead-out side are prevented.

The continuous electric power supply device is further specified in the above device by that the elastic member is a flat spring, and the flat spring is disposed along an inner surface of the loop portion.

According to the device mentioned above, the flat spring is disposed with a curved or loop shape along the inner surface of the loop portion and loads the loop portion to be expanded in the radial direction. A bottom end of the flat spring is fixed and a top end of the flat spring is a free end. The bottom end of the flat spring is preferably positioned at an opposite side against the oval opening of the protector. The flat spring is always touching or contacting with the inner surface of the loop portion without sliding.

The continuous electric power supply device is further specified in the above device by that the flat spring has such a length to form a loop shape with an intersection.

According to the device mentioned above, the loop portion of the wire harness is statically supported throughout with a uniform force by the loop-shape flat spring. Thereby, the loop portion is maintained in round or near round shape, so that the wire harness does not have a partial load and the slack thereof is absorbed more smoothly and the bending durability is more improved.

The continuous electric power supply device is further specified in the above device by that the elastic member is a coil spring and the loop portion is inserted through an inside of the coil spring.

According to the device mentioned above, in accordance with an action of leading out the wire harness, the loop portion of the wire harness is shrunk in the radial direction and the coil spring is compressed in lengthwise thereof at support point of a fixed bottom end. The top end of the coil spring moves toward the bottom end in a compressing direction, and an inner surface of the coil spring slides on an outer surface of the loop portion. The compressed coil spring has a restoring force in a direction of expanding the coil spring. When the wire harness intends to have large slack in the partially opened slide structure, the slack is absorbed by expanding the loop portion in the radial direction by the restoring force. The coil spring expands in a top end direction at the support portion of the bottom end. A spring constant of the coil spring is substantially constant, so that the restoring force may not increase or decrease rapidly and the loop portion is smoothly expanded in the radial direction.

The continuous electric power supply device is further specified in the above device by that a bottom end of the coil spring is fixed, at a fixed side of the loop portion, on the loop portion or the protector, and a top end of the coil spring is fixed on the protector at a moving side of the loop portion to be slidable against the loop portion.

According to the device mentioned above, in accordance with an action of leading out the wire harness, the loop portion of the wire harness is shrunk in the radial direction and the coil spring is compressed in lengthwise thereof at support point of a fixed bottom end. The top end of the coil spring moves toward the bottom end in a compressing direction, and an inner surface of the coil spring slides on an outer surface of the loop portion. The compressed coil spring has a restoring force in a direction of expanding the coil spring. When the wire harness intends to have large slack in the partially opened slide structure, the slack is absorbed by expanding the loop portion in the radial direction by the restoring force. The coil spring expands in a top end direction at the support poring of the bottom end. A spring constant of the coil spring is substantially constant, so that the restoring force may not increase or decrease rapidly and the loop portion is smoothly expanded in the radial direction.

The continuous electric power supply device is further specified in the above device by that the coil spring is provided at the top end thereof with a cylindrical harness guide.

According to the device mentioned above, when the top end of the coil spring slides along the loop portion of the wire harness, sliding motion between the wire harness is acted smoothly without sticking by the harness guide.

The continuous electric power supply device is further specified in the above device by that the coil spring is formed to have a smaller diameter toward the topside thereof for contacting the loop portion so as to bend the loop portion with a large radius.

According to the device mentioned above, a small radius portion at the top end of the coil spring contacts slidably with the loop portion of the wire harness with little gap in a suitable length. Suitable strong bending stiffness of the small radius portion controls a radius of the bent wire harness and folding the wire harness at the top end of the spring is eliminated.

The continuous electric power supply device is further specified in the above device by that the elastic member is a spiral spring disposed inside the loop portion.

According to the device mentioned above, when opening or closing the slide structure, the loop portion of the wire harness is shrunk in the radial direction together with the spiral spring in accordance with an action of leading out the wire harness, and loaded to be expanded in the radial direction by the spiral spring. When the slide structure is in a partial opened condition, the wire harness intends to have large slack, but the slack is absorbed by expanding the loop portion by an elastic reaction force of the spiral spring. An outermost surface of the spiral spring contacts with the inner surface of the loop portion. The spiral spring is shrunk uniformly in the radial direction at a support point of the center thereof to provide uniform load force against the loop portion.

The continuous electric power supply device is further specified in the above device by that the spiral spring is turned from a center area of the loop portion to a direction to lead out the wire harness.

According to the device mentioned above, in accordance with an action of shrinking the loop portion of the wire harness in the radial direction, the top end of the spiral spring is pulled integrally toward a direction of pulling out the wire harness. Thereby, the spiral spring is shrunk smoothly. If the spiral spring is turned in an opposite direction, when the wire harness is pulled out, the top end of the spiral spring is pulled to expand the spiral spring. Therefore, the spiral spring cannot be shrunk smoothly.

The continuous electric power supply device is further specified in the above device by that a center side end of the spiral spring is fixed on the protector, and a top end of the spiral spring is fixed on the loop portion.

According to the device mentioned above, the spiral spring and the loop portion of the wire harness are integrally shrunk and expanded in the radial direction without a slip therebetween.

The continuous electric power supply device is further specified in the above device by that the center side end of the spiral spring is formed into an asymmetric convexo-concave shape for preventing from assembling the spiral spring oppositely on the protector.

According to the device mentioned above, even if trying to mount the spiral spring oppositely on the protector, a convex portion of the spiral spring is not fitted into a concave portion of the protector. Thereby, the spiral spring can not be mounted and prevented from an error of mounting.

The continuous electric power supply device is further specified in the above device by that the top end of the spiral spring is fixed through a fixing member on the loop portion.

According to the device mentioned above, the top end of the spiral spring and the loop portion of the wire harness are fixed easily and securely with the fixing member. The fixing member may include a spring inserting opening and be fixed on the loop portion by integral molding.

The continuous electric power supply device is further specified in the above device by that a protecting tube at the loop portion and a protection tube at lead-out side of the wire harness are connected together through a connecting member.

According to the device mentioned above, two types of protecting tubes with different materials and different shape can be connected together easily and securely with the connecting member, and the wire harness is structured. The connecting member may be fixed on one protecting tube by insert-molding so as to have a holding portion for the other protecting tube.

DESCRIPTION OF THE PREFERRED EMBODIMENT

Figure 1:
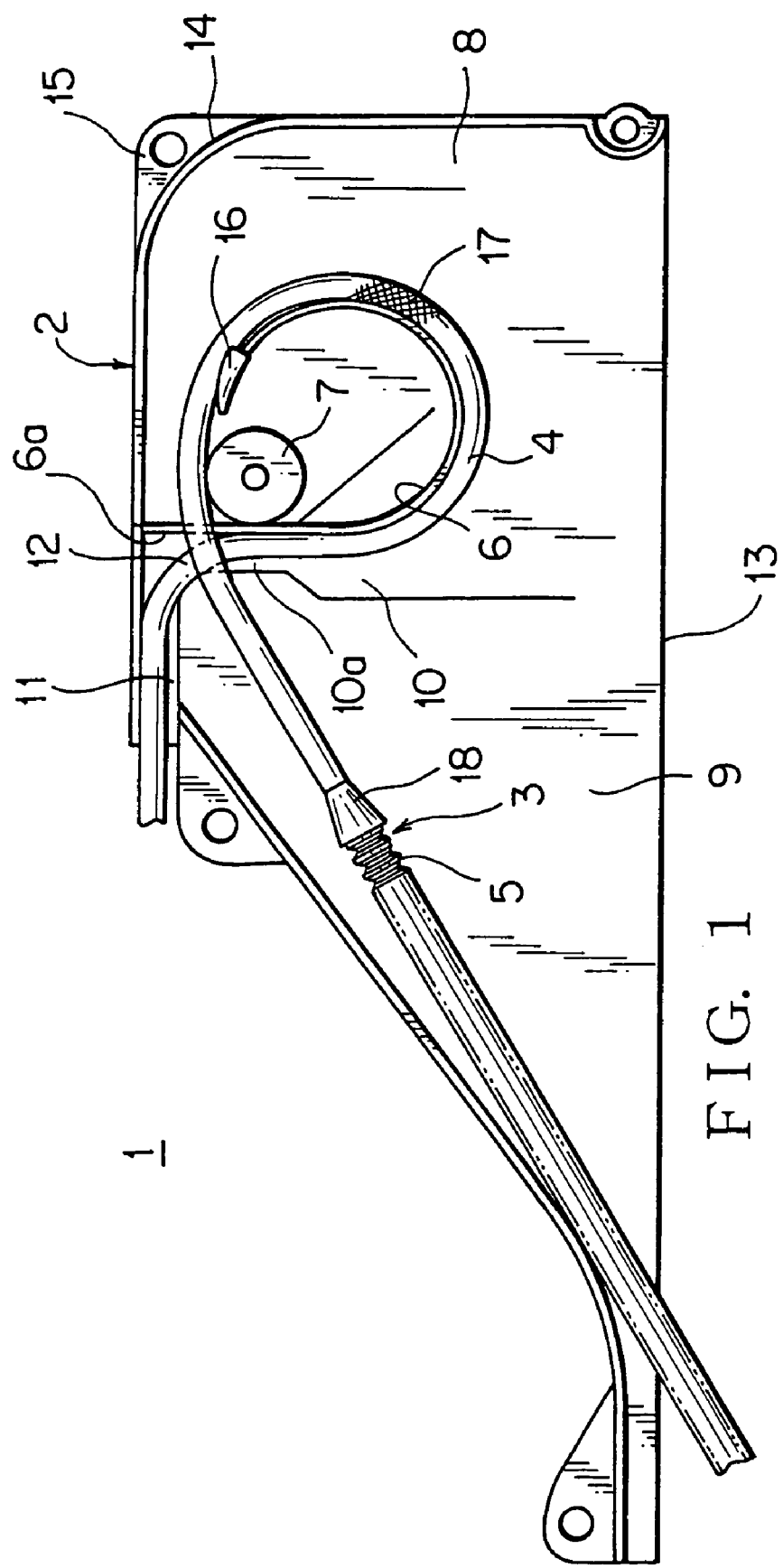
FIG. 1 is a front view in a condition of completely closed slide door of a first embodiment of a continuous electric power supply device according to the present invention.
Figure 2:
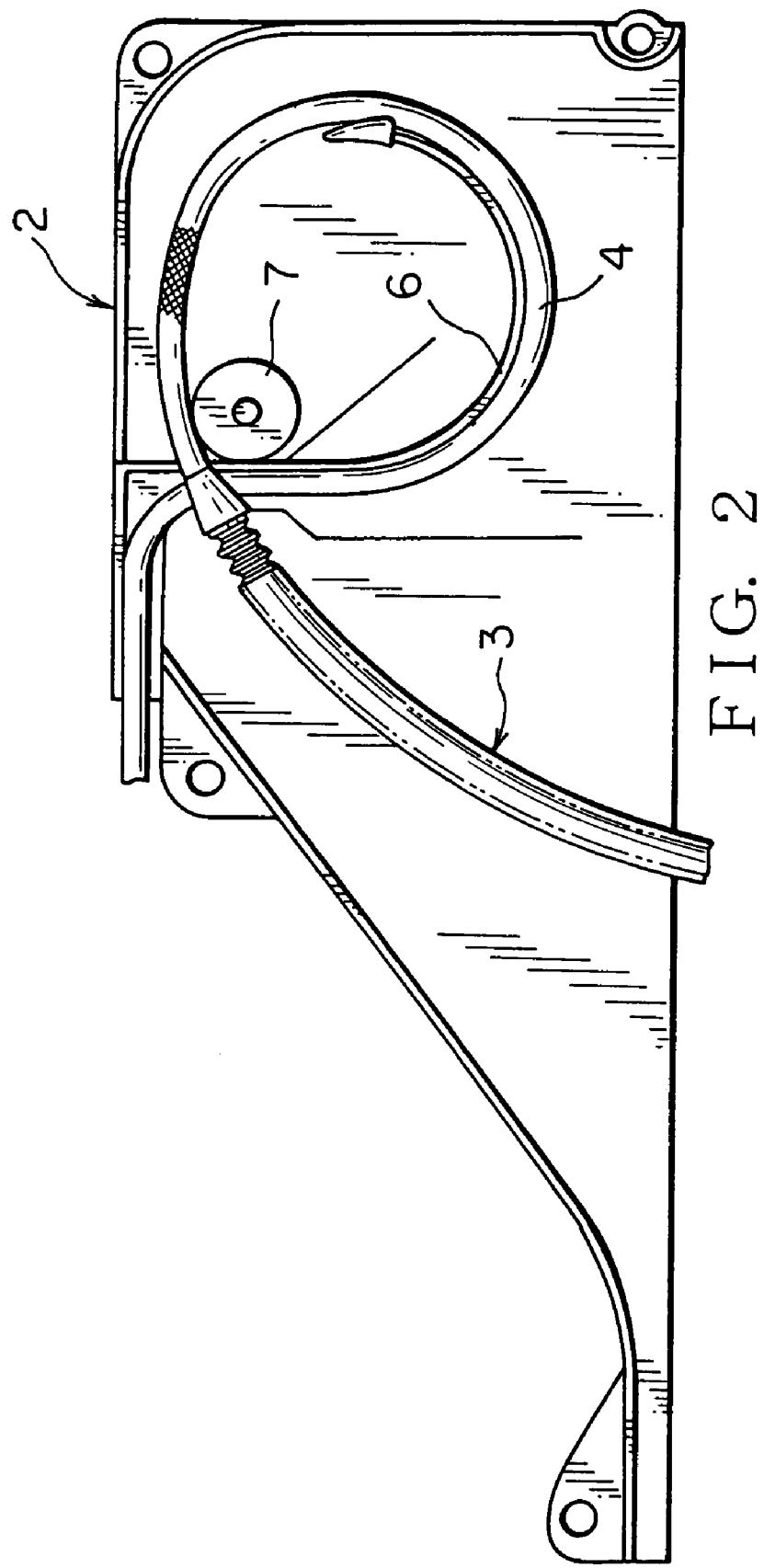
FIG. 2 is a front view in a condition of partially opened slide door of the continuous electric power supply device.
Figure 3:
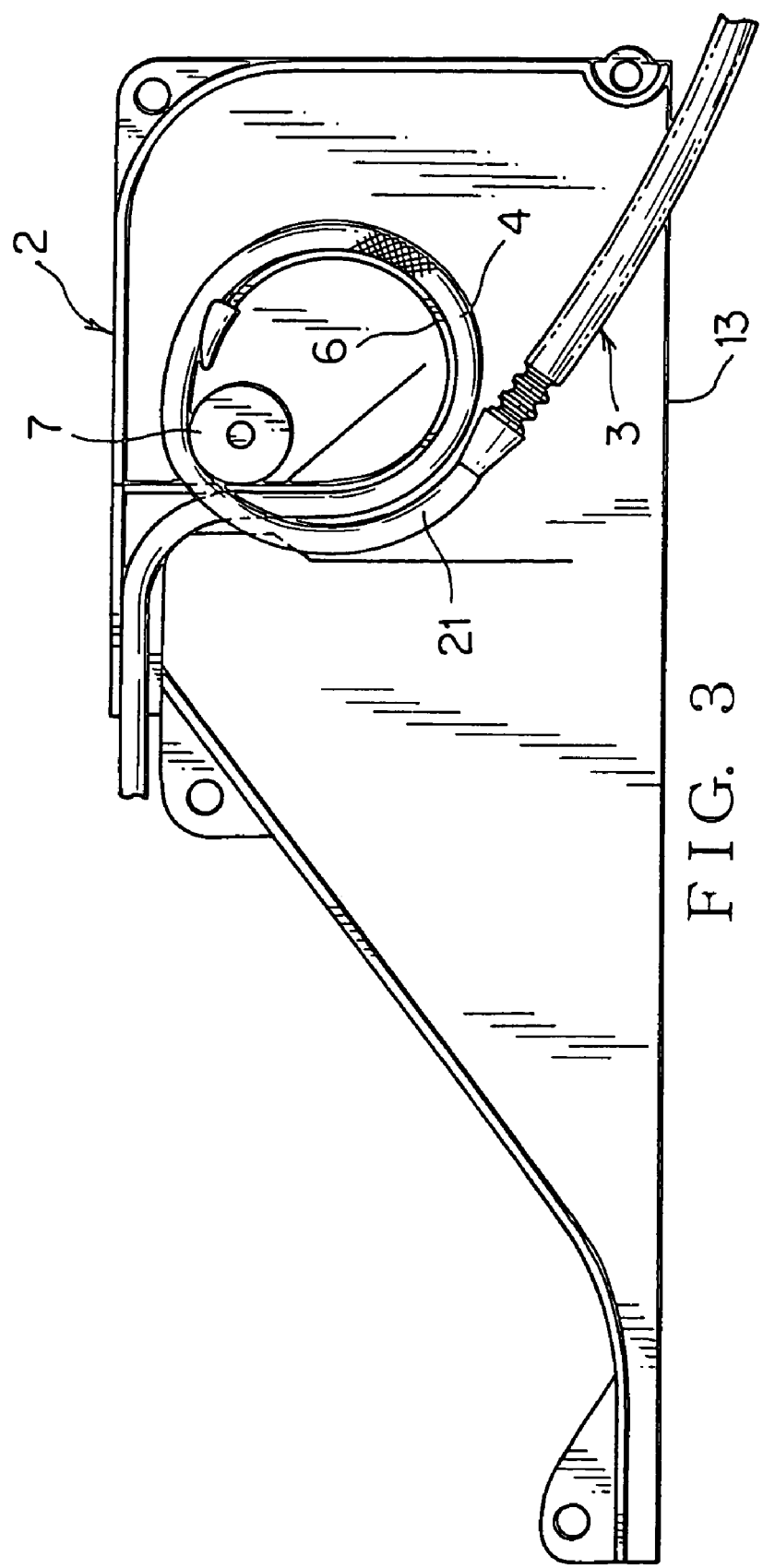
FIG. 3 is a front view in a condition of full opened slide door of the continuous electric power supply device.

FIG. 1–3 show a first embodiment of a continuous electric power supply device according to the present invention. FIG. 1 shows the device in a completely closed door, and FIG. 3 shows the device in a full opened door.

The continuous electric power supply device 1 is applied in a slide structure such as a slide door of a vehicle and includes a synthetic resin protector 2, a metallic flat spring 6 (elastic member) disposed along a wire harness 3 formed into a loop shape in a protector 2, and a guide roller 7 (guide portion) for supporting a loop portion 4 of of the wire harness 3 in the protector 2.

Figure 19:
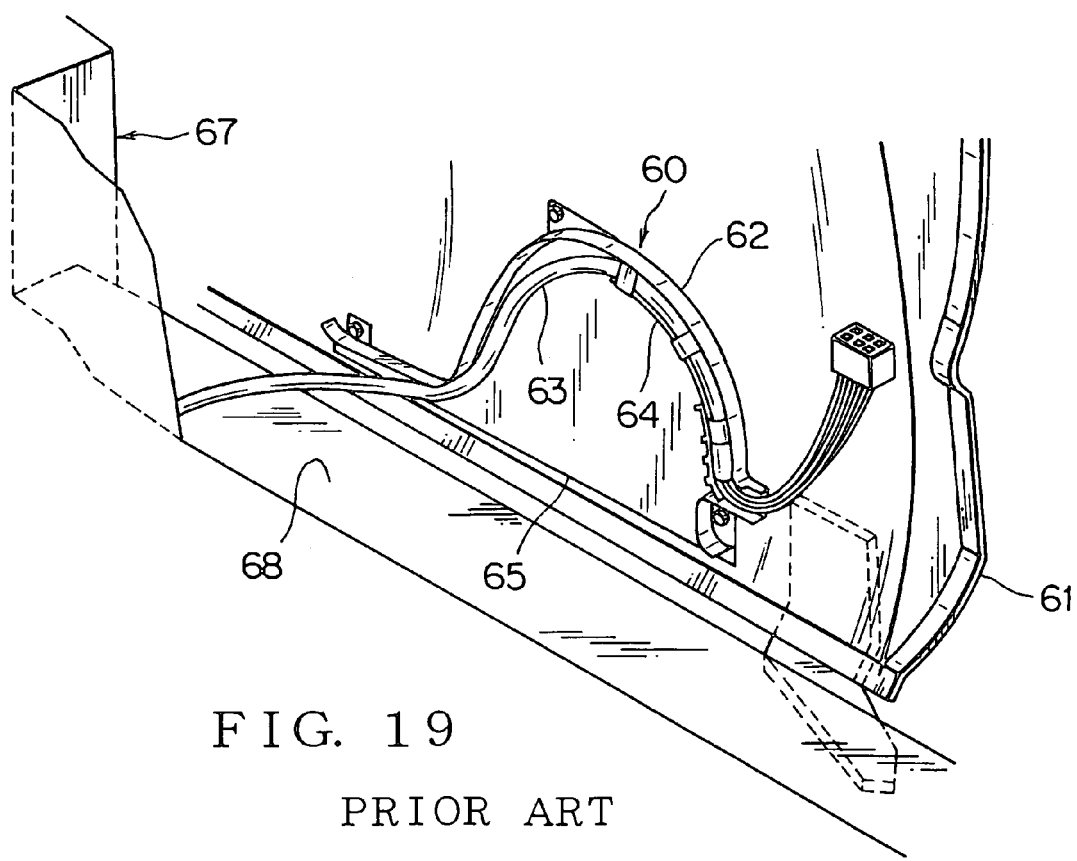
FIG. 19 is a perspective view in a condition of closed slide door of one embodiment of a continuous electric power supply device by prior art.
Figure 20:
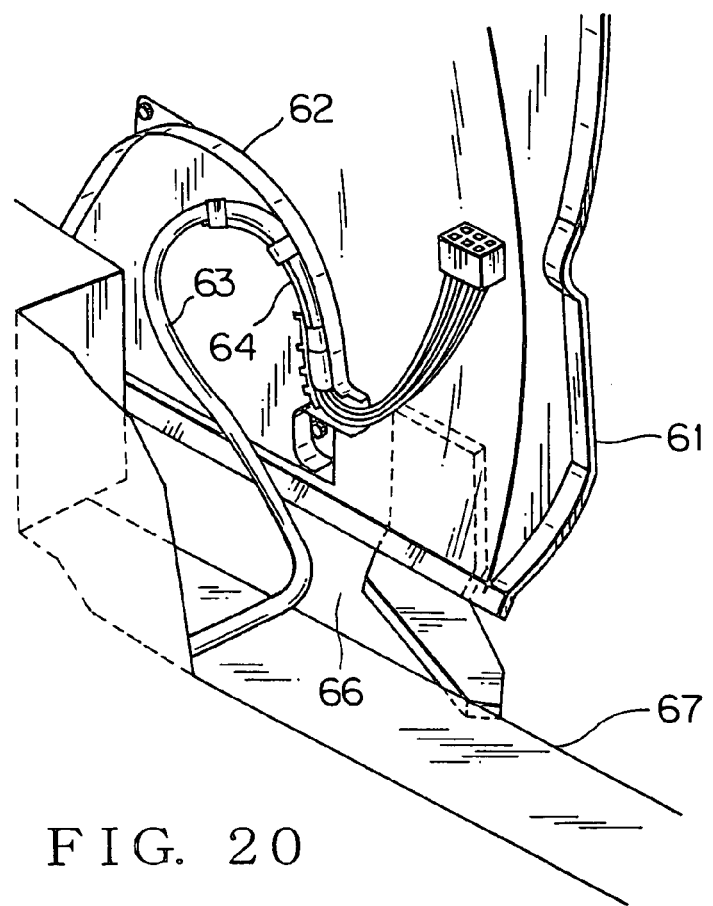
FIG. 20 is a perspective view in a condition of partially opened slide door of the continuous electric power supply device by prior art.
Figure 21:
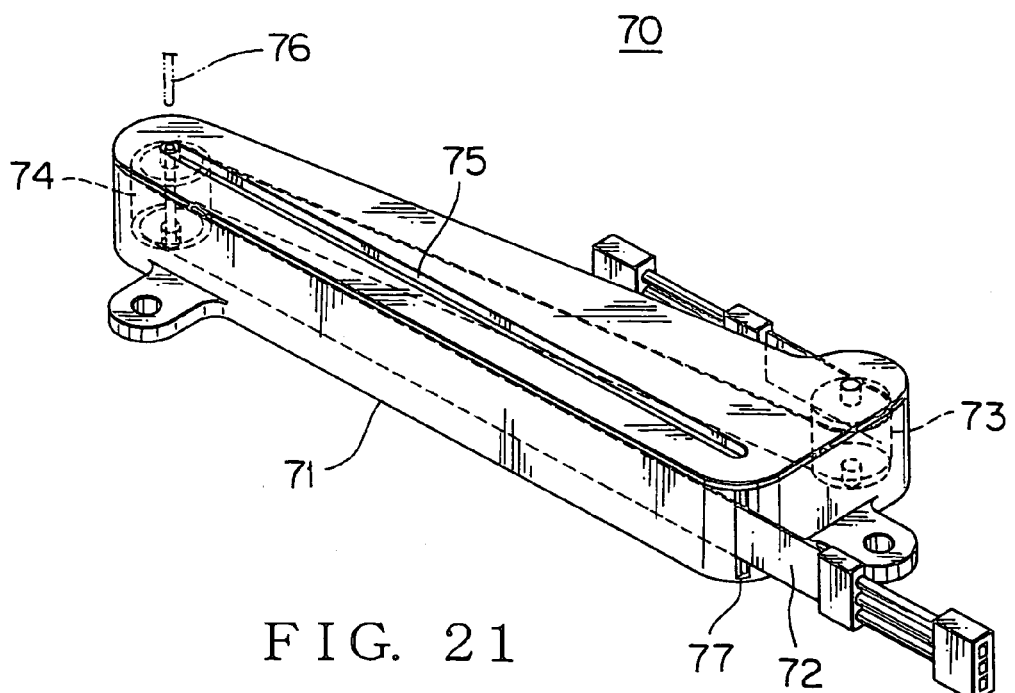
FIG. 21 is a perspective view of other embodiment of a continuous electric power supply device by prior art.

The protector 2 is formed in low profile to have a lower total height than a usual protector (FIG. 19). The protector 2 is provided with a base mounted on a panel of the slide door and a cover locked freely to open and close with the base by a lock device. In each embodiment, the base is shown, but the cover is not shown.

The protector 2 has a recess 10 recessing to spread in a fan shape from top to down between a front half flat portion 8 and a rear half flat portion 9. A top end of the recess 10 is narrow and deep, and the recess 10 is wider and gradually shallower toward a bottom end to be in the same plane as the flat portion 8. A narrow portion 10a at the top end continues to one harness leading portion 11. The wire harness 3 is fixed by banding at the harness leading portion 11 or near thereto on the protector 2, and wired from the harness leading portion 11 toward a electric device and an auxiliary device in the slide door.

The wire harness 3 is wired from the horizontal harness leading portion 11 through the vertical narrow portion 10a, on the front half flat portion 8 to be formed with a loop portion 4, through the guide roller 7, over (intersecting) a part 12 of the wire harness in the narrow portion 10a and toward the rear half flat portion 9. The protector 2 is provided at a bottom thereof with a long opening 13 as the other harness leading portion 13. The wire harness 3 is wired from the bottom opening 13 through a traversing space to a vehicle body.

The protector 2 is surrounded at top, front and rear sides with a side wall 14, and provided at an outside of the side wall 14 with a fixing portion 15 against a door panel. Front and rear directions of the protector 2 correspond to front and rear directions of the vehicle. Condition of using the protector 2 is the same as the example by prior art in FIG. 19.

A bottom end 6a of the flat spring 6 is fixed downwardly at a rear end of the front half flat portion 8 or in the narrow portion 10a of the recess 10 of the protector 2. And the flat spring is curved or looped along the inner surface of the loop portion 4 of the wire harness 3. The bottom end 6a of the flat spring 6 may be fixed on the protector 2 by various methods, such as a metal bracket, a screw and insert molding.

A synthetic resin curved cap 16 is fixed at the top end of the flat spring 6 and the loop portion 4 is supported securely without coming-out along a curved groove of the cap 16. The cap 16 may have an insert opening for inserting a lock portion of the flat spring therein.

Instead of the cap 16, the top end of the flat spring 6 may be formed to have a groove, or by bending the top end of the flat spring 6 inwardly in a radial direction, the flat spring can be prevented from penetrating to the loop portion 4.

The flat spring 6 in this embodiment does not make complete annular shape in all cases of completely closed, partially opened and full opened slide door so as to have a length giving a gap between the bottom end 6a and the top end (cap top) of the flat spring 6.

When the length of the flat spring 6 is extremely shorter than that of this embodiment, the loop portion 4 of the wire harness 3 may be hardly maintained in round shape and formed into an oval shape. Thereby, the loop portion 4 would project from the bottom opening 13 of the protector 2, or a small radius bent portion of the loop portion 4 may have stress concentration. Therefore, the flat spring 6 is preferably designed to have a length to form a loop shape (annual shape). Thereby, the loop portion 4 of the wire harness 3 can be maintained in round or near round shape.

By extending the length of the flat spring 6 longer than that of this embodiment, the flat spring 6 can make complete annular shape (loop shape) in all cases of completely closed, partially opened and full opened slide door, and crossing the bottom end 6a and the top end of the flat spring 6 is effective. The flat spring 6 may have a length to form complete annular shape in the completely closed and full opened slide door and to have a gap between the bottom end 6a and the top end of the flat spring 6 in the partially opened slide door. Instead of the flat spring 6, a spring member made of bar or wire having round, rectangular and triangular cross section can be used.

In this embodiment, the synthetic resin guide roller 7 is supported rotatably by a shaft adjacent to the bottom end 6a of the flat spring 6 at an upper side of the front half flat portion 8 of the protector 2. The guide roller 7 positions the loop portion 4 of the wire harness 3 always at the upper side of the protector 2 and effects to maintain the loop portion 4 in near round shape.

By making an outer side of the guide roller 7 with a hard material and an inner side thereof with a soft material such as an urethane, or by making whole guide roller with a soft material such as a synthetic rubber, wear and rubbing noise of the wire harness 3 can be reduced.

Instead of the guide roller 7, a non-rotating annular, round or curved member or a curved guide wall integrated with the protector 2 can be used. The guide wall will be described later. These guides are preferably formed into a shape along the loop portion 4 of the wire harness 3. When the wire harness 3 does not fall down in the protector 2, for example, the flat spring 6 has enough length to form complete annular shape so as to push the wire harness 3 upwardly, or the protector 2 is disposed horizontally or slantwise, the guide roller 7 or the guide wall can be eliminated.

The wire harness 3 in this embodiment is covered on the outer surface thereof from the upper side harness leading portion 11 to the loop portion 4 having a length in the partially opened slide door (FIG. 2) with a synthetic-resin round-cross-sectional mesh tube 17. The wire harness 3 is covered on the outer surface thereof from an end of the loop portion 4 in the partially opened slide door, through the bottom opening 13, to a part at a side of the vehicle body with a synthetic-resin oval-cross-sectional corrugated tube 5.

The loop portion 4 of the wire harness 3 can be bent flexibly by the mesh tube 17 and the wire harness 3 between the slide door and the vehicle body (the traversing space) is protected by the corrugated tube 5. The mesh tube 17 and the corrugated tube 5 are known generally as a protecting tube. A connecting portion 18 of the both protecting tubes 5, 17 may be wound with a tape or used by a later-described connecting member.

Instead of the mesh tube 17, a vinyl tape can be used to wind a plurality of electric wires with a large interval. Instead of the corrugated tube 5, the mesh tube 17 can be used continuously. The corrugated tube 5 may be not only oval cross-sectional, but also round cross-sectional.

In the completely closed slide door of FIG. 1 (closed by sliding the slide door in a forward direction of the vehicle), the wire harness 3 is pulled rearwardly at a supporting point of the guide roller 7. And the loop portion 4 is shrunk in the radial direction with near round shape. The flat spring 6 is shrunk in the radial direction and in loop shape, integrally with the loop portion 4, and loads strongly to expand the loop portion 4 in the radial direction.

The outer surface of the flat spring 6 always contacts tightly with the inner surface of the loop portion 4 (regardless of completely closed, partially opened and full opened slide door). The bottom end 6a of the flat spring 6 is located at a fixed side of the wire harness 3. Thereby, a part of the wire harness (loop portion 4) along the flat spring 6 always contacts with the flat spring 6 without displacement in a lengthwise of the flat spring.

In the partially opened slide door of FIG. 2, the wire harness 3 intends to fall down (be slacked) largely. The loop portion 4 is expanded largely in the radial direction by pushing force of the flat spring 6 and the wire harness 3 is pulled into the protector 2, so that the slack (spare length) is absorbed. The wire harness 3 is received in a large loop shape into the protector 2, so that room of the protector 2 can be used efficiently, and the protector 2 can be miniaturized smaller than that by prior art (FIG. 19). In the partially opened slide door, the flat spring 6 still loads the loop portion 4 to be expanded in the radial direction.

In the full opened slide door of FIG. 3, the wire harness 3 is pulled forwardly and shrunk in the radial direction with loop shape in the protector 2. The flat spring 6 is integrally formed in loop shape along the inner surface of the loop portion 4 and load the loop portion 4 to be expanded in the radial direction, as same as in the completely closed slide door. Corresponding to opening and closing the slide door as shown in FIG. 1–3, the wire harness 3 swings back and forth along the bottom opening 13 of the protector 2.

In all condition, the wire harness 3 is supported expandably by the whole flat spring 6, and shrunk and expanded in the radial direction with near round shape in the protector 2. Thereby, the wire harness 3 is not acted with a partial load (bending stress), so that bending durability of the wire harness 3 is improved. And sliding friction between the wire harness 3 and the guide, such as the guide roller 7 and the guide wall, is reduced, so that the slack of wire harness 3 is absorbed smoothly. The wire harness 3 is formed in loop shape to use room of the protector 2 efficiently, so that the protector 2 can be miniaturized in height and length (front-to-rear).

Figure 4:
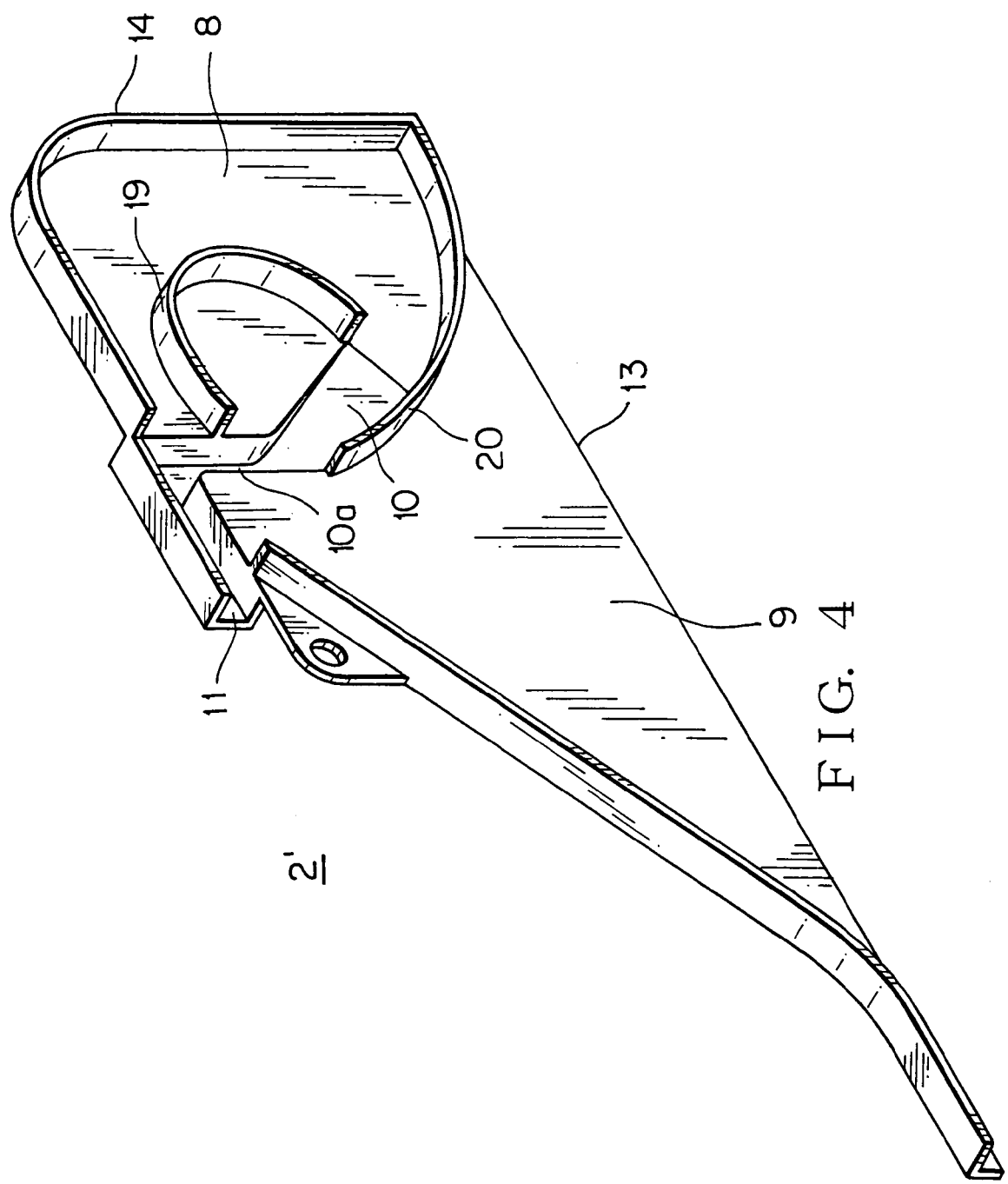
FIG. 4 is a perspective view of other embodiment of the protector of the continuous electric power supply device.

FIG. 4 shows the other embodiment of the protector. The protector 2' eliminates the guide roller 7 in the above embodiment, and instead thereof, a spring guide wall 19 is provided and a harness guide wall 20 is disposed between the bottom opening 13 and the guide wall 19. Other structure is the same as the embodiment shown in FIG. 1, and the same structural parts are marked with the same marks with no description.

The spring guide wall 19 controls bending (not too much) the flat spring 6 (FIG. 1) to ensure the minimum bending radius, and acts a guide wall for forming the wire harness 3 along it. The spring guide wall 19 projects integrally from the front half flat portion 8, i.e. a vertical base plate, of the protector 2', and is formed into a half circle or an arc shape along the flat portion 8. An outer radius of the spring guide wall 19 is preferably designed slightly smaller than the minimum inner radius of the flat spring 6 in the completely closed door of FIG. 1 and the full opened door of FIG. 3.

When the flat spring 6 is shrunk to small radius in the completely closed door of FIG. 1 and the full opened door of FIG. 3, the flat spring 6 is formed to have a small gap against the outer surface of the spring guide wall 19. When the slide door is opened and closed rapidly and the wire harness 3 is pulled strongly, the flat spring 6 contacts along the guide wall 19 to prevent more shrinking the flat spring 6 in the radial direction. Thereby, the flat spring 6 is prevented from plastic deformation and breakage.

Simultaneously, the wire harness 3 is contacted and supported by the spring guide wall 19 instead of the guide roller 7 of FIG. 1, and the loop portion 4 (FIG. 1) is maintained in near round shape. Thereby, the wire harness 3 is not loaded with an unexpected bending stress, and bending durability thereof is improved.

The harness guide wall 20 is disposed under the spring guide wall 19 to have the center recess 10 of the protector 2' therebetween. The harness guide wall 20 projects from the rear end of the recess 10 and extends curvedly to a bottom side of a front end portion of the side wall 14 of the protector 2'. The harness guide wall 20 has the same projecting height as the spring guide wall 19.

The wire harness 3 (FIG. 3) is led rearwardly and circularly along the spring guide wall 19 and from the bottom opening 13 of the protector 2' to the vehicle body side along an outer surface of the harness guide wall 20. In the full opened slide door of FIG. 3, the wire harness 3 is pulled forwardly, and a pulled portion 21 and the loop portion 4 of the wire harness 3 are partitioned by the harness guide wall 20. Thereby, the pulled portion 21 is not slid against the loop portion 4, and friction therebetween is reduced and wear thereof is prevented.

The protector 2' in FIG. 4 is provided both with the spring guide wall 19 and the harness guide wall 20. A protector can be provided with one of the spring guide wall 19 and the harness guide wall 20 and also can be provided with the roller guide 7 and the harness guide wall 20. These protectors can be applied for a later-described continuous electric power supply device.

FIG. 5–8 show a second embodiment of the continuous electric power supply device according to this invention. The same structural parts as the above embodiment are put with the same marks without description.

A continuous electric power supply device 23 is applied for a slide structure such as a slide door of a vehicle, and includes a synthetic resin protector 2, a metal coil spring 24 disposed along an outer surface of the wire harness 3 formed into a loop shape in the protector 2 and a guide roller 7 (guide portion) supporting the loop portion 4 of the wire harness 3 in the protector 2. The structure of the protector 2 is the same as that of the first embodiment.

Figure 6:
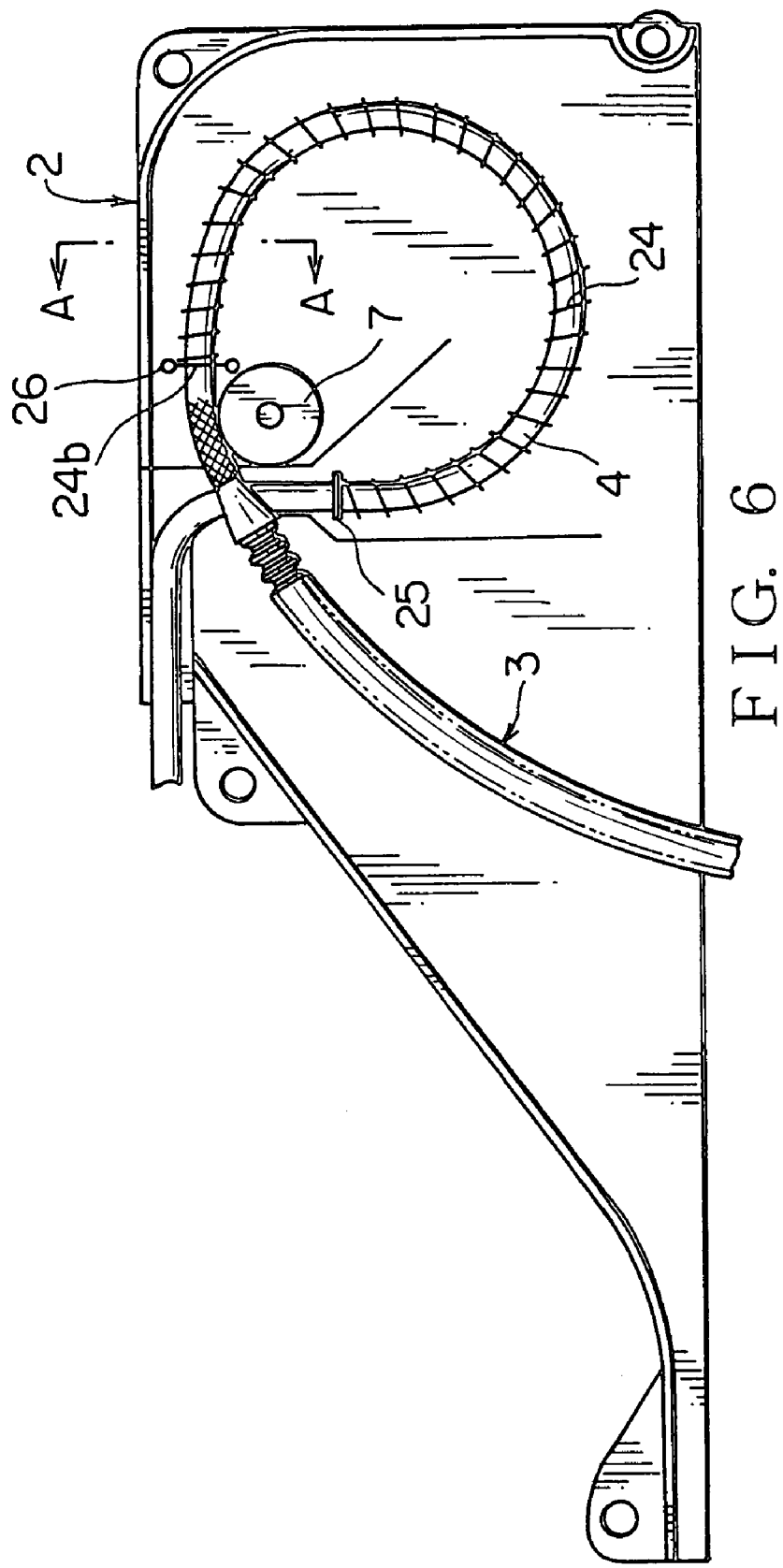
FIG. 6 is a front view in a condition of partially opened slide door of the continuous electric power supply device.

Turning a relatively thin spring wire in coil shape with many turns forms the coil spring 24. A bottom end 24a of the coil spring 24 is fixed at a bottom end (fixed end) of the loop portion 4 of the wire harness 3 on the loop portion 4 or the protector 2. A top end 24b of the coil spring 24 is fixed at a top end (moving end) of the loop portion 4 on the protector 2. Thereby, in accordance with shrinking the loop portion 4 in the radial direction, the coil spring 24 is compressed, and in accordance with expanding the loop portion 4 in the radial direction, the coil spring 24 is expanded. The coil spring 24 is mounted with small compression so as to have a pushing force in an expanding direction in a condition of expanding the loop portion 4 in the largest radius (FIG. 6).

The bottom end 24a of the coil spring 24 is fixed on the mesh tube 17 covering the outer surface of the wire harness 3 with a synthetic resin annual fixing member 25 or fixed on a fixing seat formed to project integrally from the protector 2. The top end 24b of the coil spring 24 is fixed on a fixing seat formed to project integrally from the protector 2. Or, a half ring fixing seat fitting with the top end 24b of the coil spring 24, a pair of rings or a pair of fixing pillars (fixing portion 26) may be fixed on the protector 2 by screwing, locking or adhering.

Near the fixing portion 26, the guide roller 7 supports the loop portion 4 of the wire harness 3, not coil spring 4. The guide roller 7 is disposed between the fixing portion 26 and the recess 10. If the top end 24b of the coil spring 24 is fixed at a position of the guide roller 7, the fixing portion 26 performs as a harness guide, so that the guide roller 7 can be eliminated. When the bottom end 24a of the coil spring 24 is fixed on the protector 2, the fixing member 25 maybe provided with a swing mechanism so as to follow smoothly in accordance with motion in the radial direction of expanding and shrinking the loop portion 4. The same ting can be said about the fixing portion 26 for the top end 24b of the coil spring 24.

The wire harness 3 is led from the top of the protector 2 through the recess 10 in the center of the protector 2 to outside, and fixed near the harness leading portion 11. The loop portion 4 of the wire harness 3 led into the protector 2 through the recess 10 is expandable and shrinkable along the inner surface of the front half flat portion 8, which is the vertical base plate.

Figure 5:
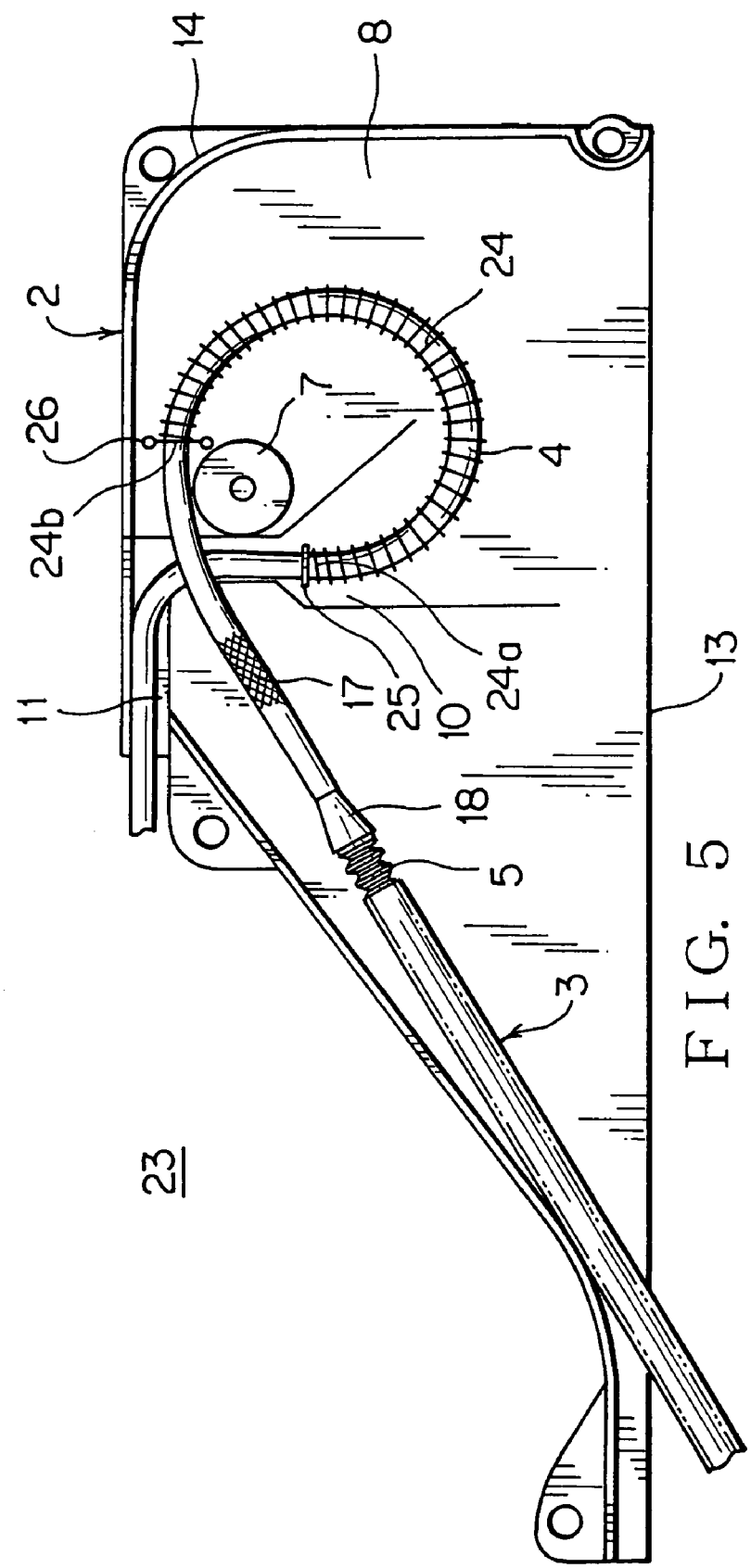
FIG. 5 is a front view in a condition of completely closed slide door of a second embodiment of a continuous electric power supply device according to the present invention.

In the completely closed slide door of FIG. 5, the wire harness 3 at the corrugated tube 5 side is pulled rearwardly, and the loop portion 4 is shrunk in the radial direction at the support points of the guide roller 7 and the fixing portion 26 of the top end 24b of the coil spring 24 in the protector 2. Thereby, the coil spring 24 is compressed to generate a pushing force (expanding force) in the radial direction.

When the wire harness 3 intends to slack by a weight itself in the partially opened slide door of FIG. 6, the loop portion 4 is expanded largely in the radial direction by the pushing force, so that the slack (spare length) is absorbed. The coil spring 24 extends annually to expand the lop portion 4 in the radial direction. The extended coil spring 24 still has a pushing force in the extending direction (in the radial direction). The loop portion 4 moves smoothly with low friction along the guide roller 7 so as to expand or shrink in the radial direction.

Figure 7:
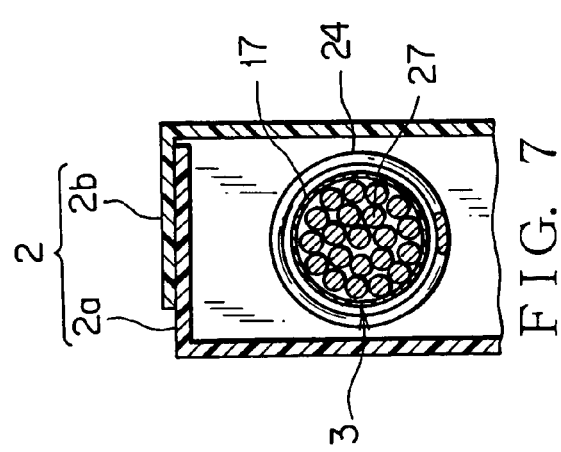
FIG. 7 is a sectional view taking along the line A—A in FIG. 6, showing inside of the protector.

FIG. 7 is a sectional view taken along the line A—A in FIG. 6. The coil spring 24 is disposed with a small gap in the protector 2 formed with the base 2a and the cover 2b. The wire harness 3 having a plurality of electric wires and the mesh tube 17 covering the wires is received in the coil spring 24 to move freely in lengthwise thereof. The mesh tube 17 is connected with the corrugated tube 5 with the connecting portion 18 (FIG. 5).

Figure 8:
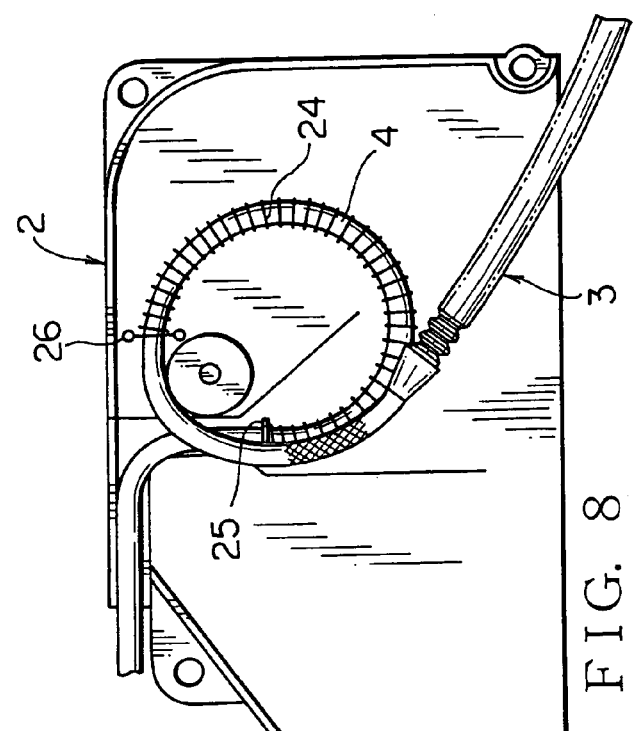
FIG. 8 is a front view in a condition of full opened slide door of the continuous electric power supply device.

In the full opened slide door of FIG. 8, the wire harness 3 is pulled forwardly, and correspondingly the loop portion 4 is shrunk in the radial direction and the coil spring 24 is compressed. When the slide door is moved from the full opened condition to the completely closed condition, opposite actions are performed. In any condition, the wire harness 3 is supported by the whole coil spring 24 to be extended and shrunk freely, so that the wire harness 3 does not have a partial load and has improved bending durability.

Figure 9:
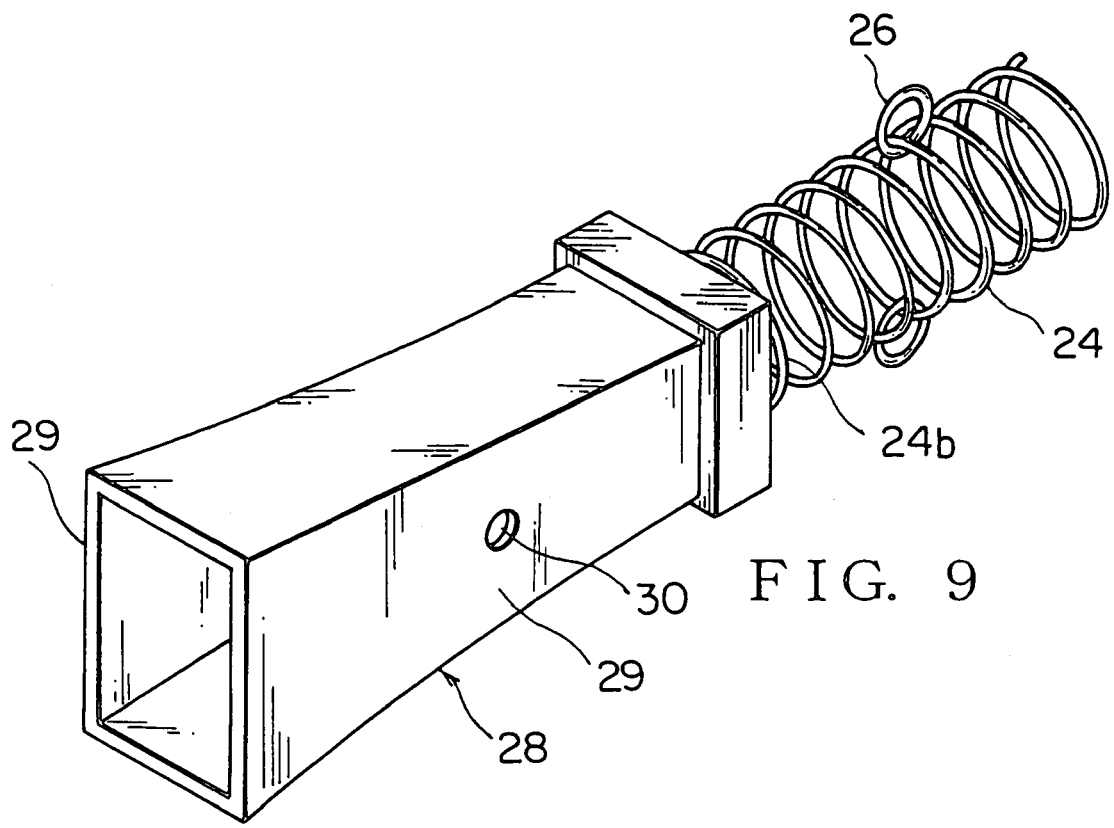
FIG. 9 is a perspective view of one embodiment of a harness guide (cap) mounted at a top end of a coil spring for pushing the harness.

The top end 24b of the coil spring 24 in FIG. 5–8 can be provided with a cap 28 (harness guide) for rubbing protection as shown in FIG. 9. The cap 28 made of synthetic resin is formed into a bugle shape to be expanded gradually in a radial direction forwardly. In this embodiment, the cap 28 is formed into a rectangular pipe along the inner surfaces of the base 2a and the cover 2b of the protector 2.

A bottom end of the cap 28 is fixed on the top end 24b of the coil spring by molding or locking means, and the top end 24b of the coil spring 24 is fixed on the protector 2 with the fixing portion 26. By providing a hole 30 or a shaft at both sidewalls 29 of the cap 28 for swinging, the cap 28 can be engaged rotatably with a shaft or hole of the protector 2. The cap 28 prevents wear and abnormal noise caused by rubbing between the top end 24b of the coil spring 24 and the wire harness 3. The cap 28 also performs as the harness guide, so that the guide roller 7 in FIG. 5–8 can be eliminated.

Figure 10:
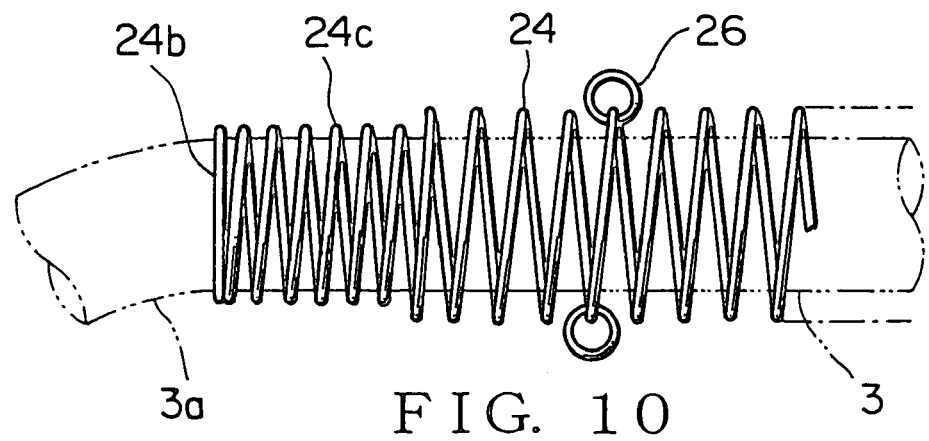
FIG. 10 is a perspective view of one embodiment of a top end of the coil spring.

By forming the top portion 24c of the coil spring 24 in FIG. 5–8 with smaller radius than the other portion of the coil spring 24 as shown in FIG. 10 to contact with the wire harness 3 having a small gap (almost no gap), a bending radius of the harness area 3a led from the top end 24b can be controlled to be large. The wire harness 3 may be bent hardly by the small radius top portion 24c of the coil spring 24, so that the bending radius is maintained large so as to prevent stress concentration.

The cap 28 in FIG. 9 may be effectively mounted at the top end 24c of the top portion 24c of the coil spring 24 in FIG. 10. The coil spring 24, the flat spring 6 in the first embodiment and the later-described spiral spring can be made of synthetic resin instead of metal. A coil spring having strong elasticity can be used instead of the flat spring 6, not to be compressed lengthwise like the coil spring 24, but so as to expand the loop portion 4 of the wire harness 3 in the radial direction by a reaction of bending force of the coil spring.

When the protector 2' in FIG. 4 is used, pulled area of the wire harness 3 and the coil spring 24 covering the loop portion is separated by the harness guide wall 20 to prevent rubbing to each other. And the spring guide wall 19 controls the minimum bending radius of the coil spring 24 to prevent bending the coil spring too much.

Figure 11:
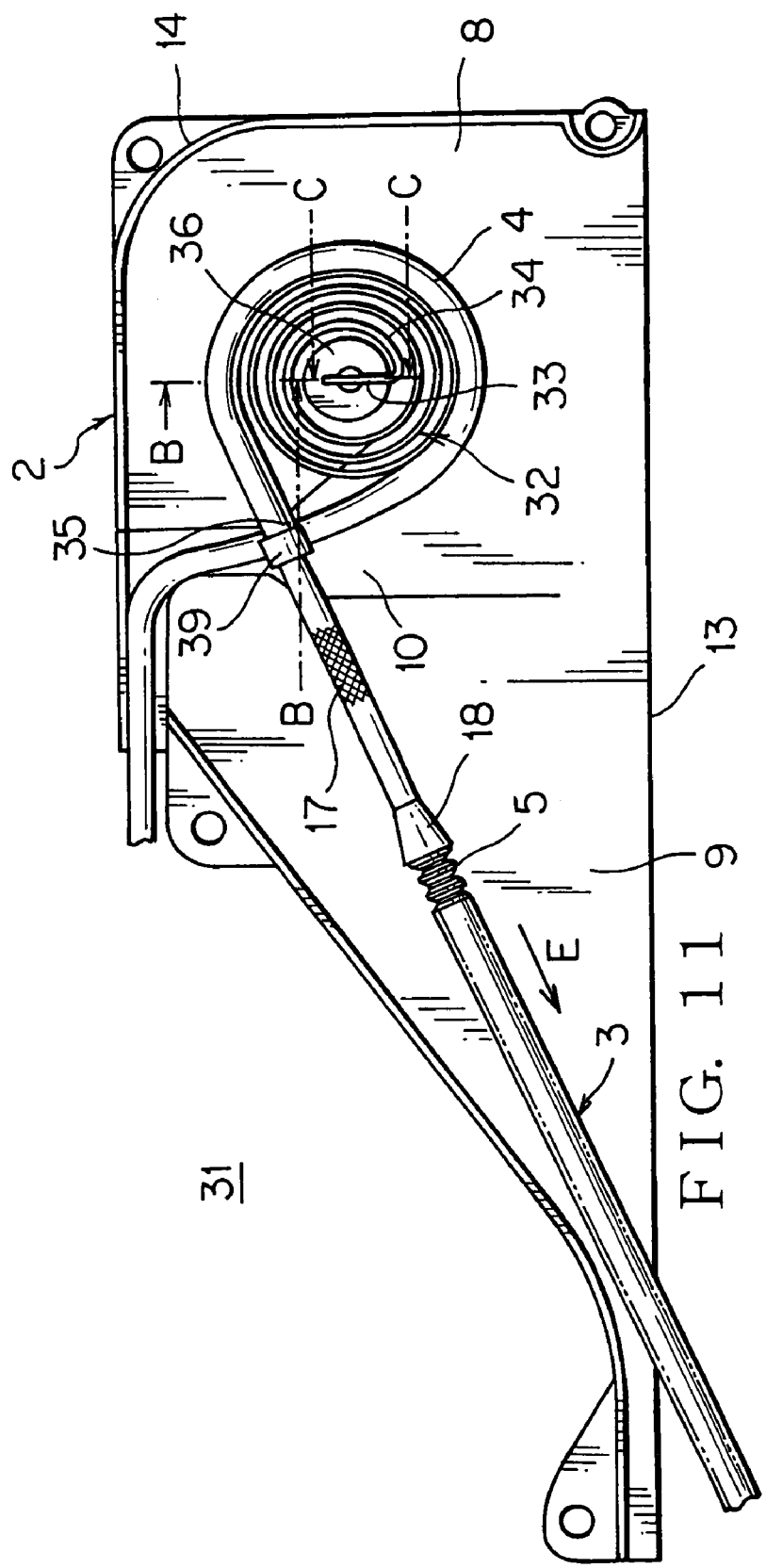
FIG. 11 is a front view in a condition of completely closed slide door of a third embodiment of a continuous electric power supply device according to the present invention.
Figure 12:
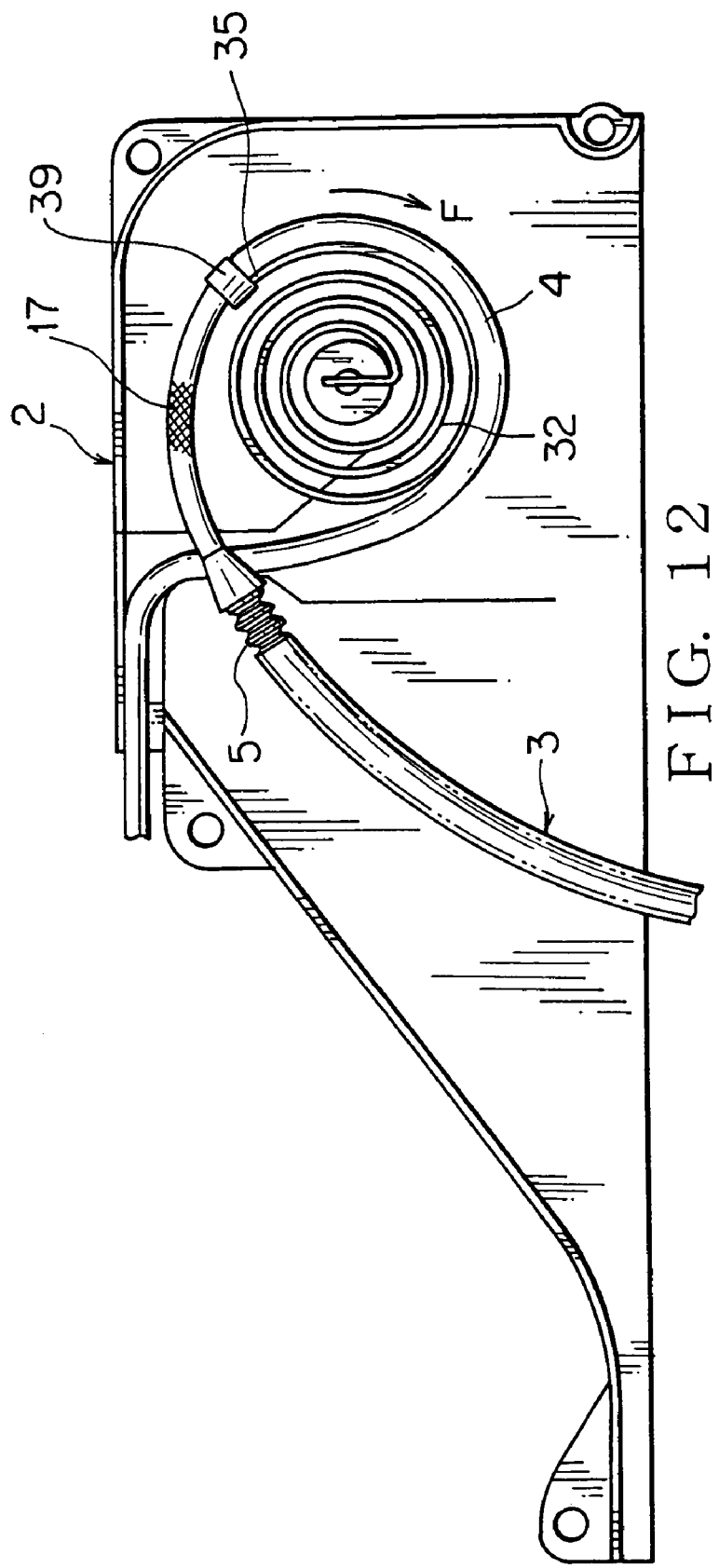
FIG. 12 is a front view in a condition of partially opened slide door of the continuous electric power supply device.
Figure 13:
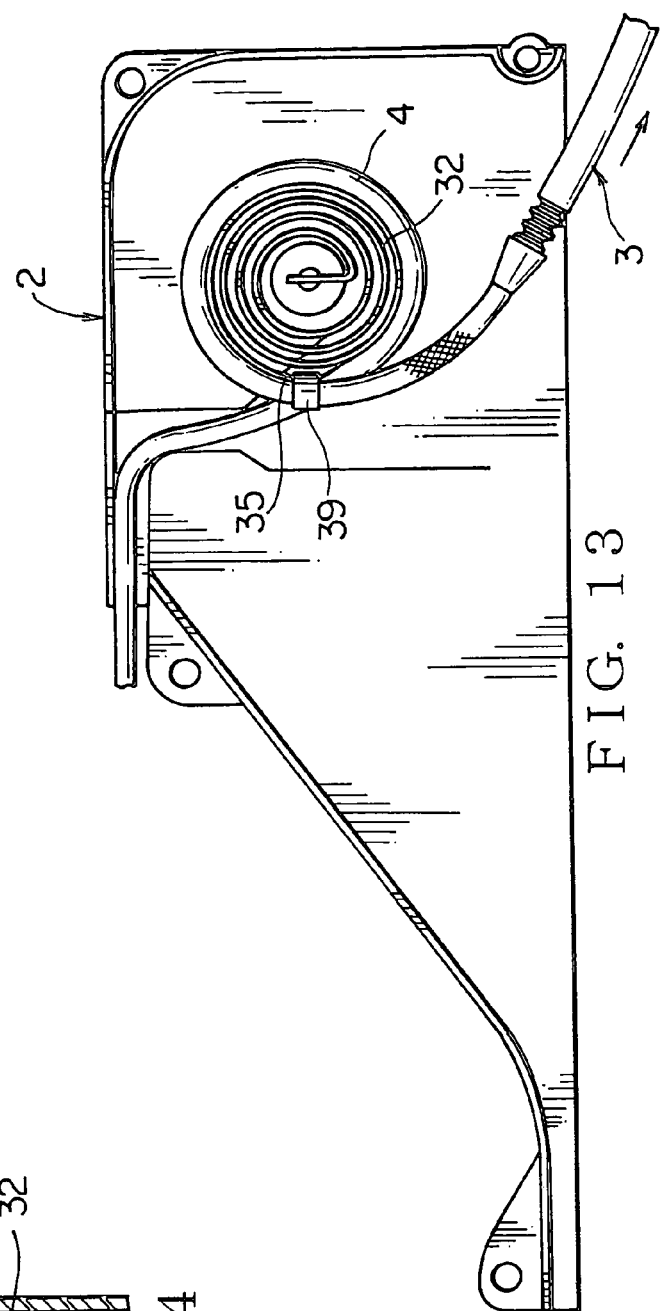
FIG. 13 is a front view in a condition of full opened slide door of the continuous electric power supply device.
Figure 14:
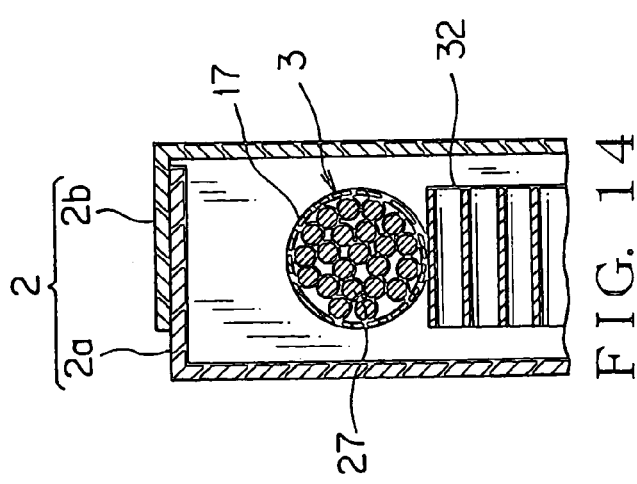
FIG. 14 is a sectional view taking along the line B—B in FIG. 11, showing inside of the protector.

FIG. 11–14 show a third embodiment of the continuous electric power supply device. FIG. 11 shows condition in the completely closed slide door. FIG. 12 shows condition in the partially opened slide door. FIG. 13 shows condition of the full opened slide door. FIG. 14 is a sectional view taken along the line B—B in FIG. 11.

This continuous electric power supply device 31 is applied for a slide structure such as a slide door of a vehicle as shown in FIG. 11–13, and includes a synthetic resin protector 2 and a metallic spiral spring 32 (elastic member) disposed in the wire harness 3 formed in loop shape in the protector 2.

The protector 2 has the same structure as that of the first embodiment, so that the same marks are putted and description is omitted. The spiral spring 32 can push uniformly the loop portion 4 of the wire harness 3 in the radial direction. Thereby, the aforesaid guide roller 7 can be eliminated.

The spiral spring made of a metallic band sheet includes a short straight fixed portion 33 at the center (bottom end), spiral portion 34 wound spirally from the fixed portion 33 to expand in the radial direction, and a fixing portion 35 in a direction tangential to a top end of the outermost side of the spiral portion 34.

The spiral spring 32 is preferably wound from the center to a direction of leading (pulling) the wire harness 3. The direction of pulling is shown with mark E. In the direction of winding spiral spring, sliding friction against the wire harness 3 is decreased, so that winding the wire harness 3 in FIG. 13 and pulling the wire harness 3 in FIG. 11, 13 can be acted smoothly and securely.

The spiral spring 32 is disposed in the protector 2 formed with the base 2a and the cover 2b. The wire harness 3 is wired in loop shape along the outer surface of the spiral spring 32. In the loop portion 4 of the wire harness 3, the mesh tube 17 covers the plurality of electric wires 27. The mesh tube 17 continues through the connecting portion 18 to the corrugated tube 5.

Figure 15:
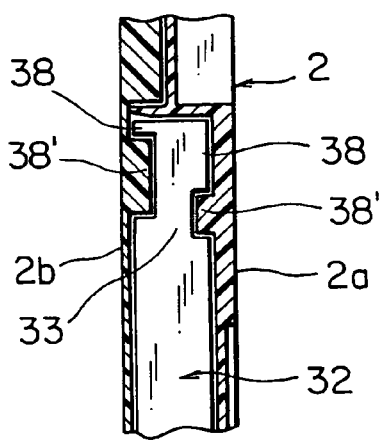
FIG. 15 is a sectional view taking along the line C—C in FIG. 11, showing fixed portion at one end of a spiral spring.

FIG. 15 shows a sectional view taken along the line C—C in FIG. 11, i.e. the fixed portion 33 at the center of the spiral spring 32. The fixed portion 33 is inserted and fixed in a groove of a boss 36 (FIG. 11) of the protector 2 to be putted between the base 2a and the cover 2b of the protector 2. The fixed portion 33 is formed asymmetrically in widthwise, so that the fixed portion 33 cannot be mounted oppositely back-and-forth or up-and-down. In FIG. 15, mark 38 indicates a convex portion of the fixed portion 32 or a concave portion of the protector 2, and mark 38' indicates a concave portion of the fixed portion or a convex portion of the protector.

Figure 16A:
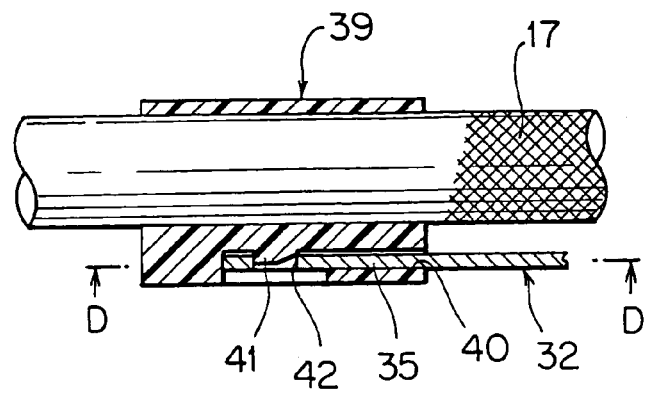
FIG. 16A is a longitudinal sectional view, showing fixing portion at the other end of the spiral spring.
Figure 16B:
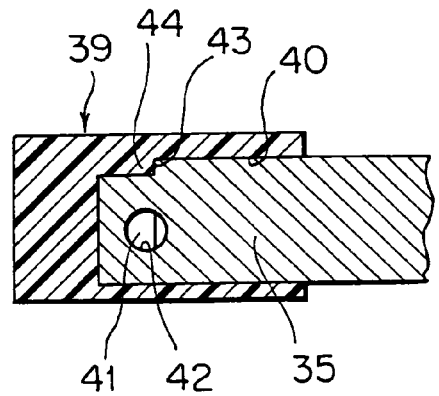
FIG. 16B is a sectional view taking along the line D—D in FIG. 16A, showing fixing portion at the other end of the spiral spring.

FIG. 16A, 16B show the fixing portion 35 at the top end of the outer side of the spiral spring 32. A synthetic resin annual fixing portion 39 is fixed at the mesh tube 17 covering the wire harness by insert molding. The fixing portion 39 is disposed with a slit-shape insert opening 40 in which the fixing portion 35 of the spiral spring 32 is inserted. A lock projection 41 is provided in the insert opening 40 and a engaging hole 42 is provided at the fixing portion 35 of the spiral spring 32. When the fixing portion 35 is inserted in the insert opening 40, the lock projection 41 and the engaging hole 42 can lock the fixing portion 35. The fixing portion 35 has a cutout 43 at a top end thereof, and the fixing portion 39 has a step 44 (projection) in the insert opening 40 so as to prevent mounting the spiral spring 32 oppositely.

A boss 36 for fixing the fixed portion 33 at the center of the spiral spring 32 is provided at the front half vertical flat portion 8. The spiral spring is disposed in a front half area of the protector 2. In accordance with open and close of the slide door, the corrugated tube 5 side of the wire harness 3 swings along the rear half flat portion 9.

In the completely closed slide door of FIG. 11, the wire harness 3 is pulled rearwardly along the arrow E. Thereby, the spiral spring 32 is shrunk in the radial direction and has a restoring force in a direction opposite to pulling direction. And the fixing portion 35 at the top end of the spiral spring is located at the recess 10 side at the center of the protector 2.

In the partially opened slide door of FIG. 12, the wire harness 3 intends to expand largely. However, spiral spring 32 is restored elastically to expand itself and the loop portion 4 of the wire harness 3 in the radial direction so as to absorb the slack of the wire harness 3. In the partially opened slide door of FIG. 12, the spiral spring 32 may not be restored completely but the restoring force along the arrow F may be preferably remained a little. The fixing portion 35 at the top end of the spring is located at a front area of the protector 2.

In the full opened slide door of FIG. 13, the wire harness 3 is pulled forwardly, and the spiral spring 32 is shrunk in the radial direction together with the loop portion 4 of the wire harness 3. The fixing portion 35 at the top end of the spring is located lower than the fixing portion 35 of FIG. 11 by rotating 180 degree from the position in FIG. 11.

In all condition, the whole spiral spring 32 supports the wire harness 3 to expand and shrink freely. Thereby, the wire harness 3 does not have a partial stress so that the bending durability of the wire harness 3 is improved. The guide roller 7 is not required, and cost reduction by eliminating parts can be done.

To control a radius of shrunk spiral spring 32 in the completely closed and full opened slide door, a bending control wall like the spring guide wall 19 in FIG. 4 can be disposed at inside of the spiral spring 32. The fixing portion 39 for fixing the top end of the spring may be fixed at the wire harness 3 by clamping. The mesh tube 17 covering the wire harness is a good example, and different type protecting tube may be used or the plurality of electric wires can be wound in long interval by a vinyl tape without any protecting tube.

As shown in FIG. 12 (partial opened door), the loop portion 4 contacting with the spiral spring 32 is covered by a flexible protecting tube such as the mesh tube 17, and a part between the loop portion 4 and the vehicle body is covered by the corrugated tube 5. The structure is the same as the first and second embodiments. These two tubes with different materials may be connected by connecting (fixing) means shown in FIG. 17, 18.

Figure 17:
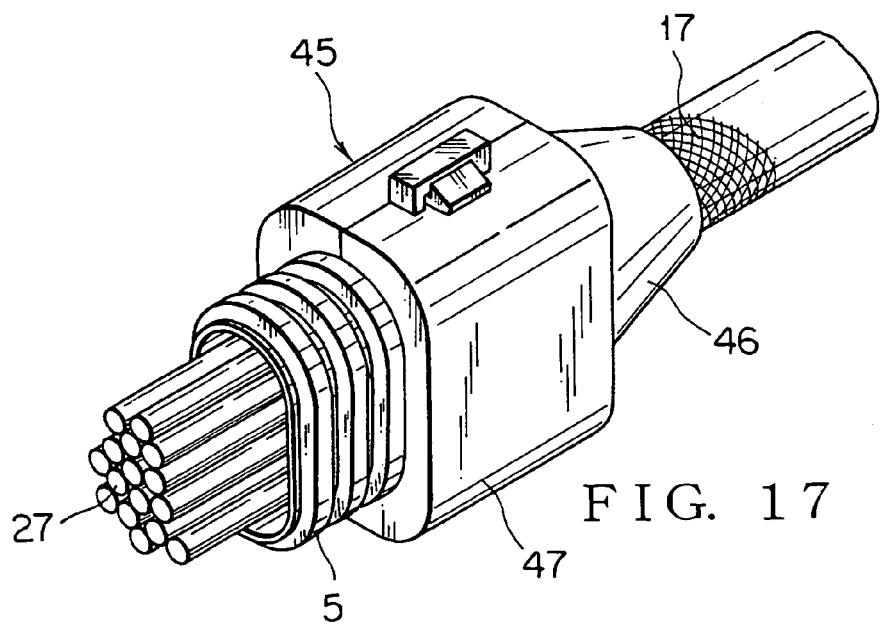
FIG. 17 is a perspective view of one embodiment of a connecting member for connecting harness protecting tubes together.

A synthetic resin fixing member 45 is fixed to the mesh tube 17 by insert molding as shown in FIG. 17, and the corrugated tube 5 is fixed in the fixing member 45 by clamping. The plurality of electric wires 27 passes through the both tubes 5, 17. The fixing member 45 can be fixed to the mesh tube 17 by welding or adhering instead of insert molding.

Figure 18:
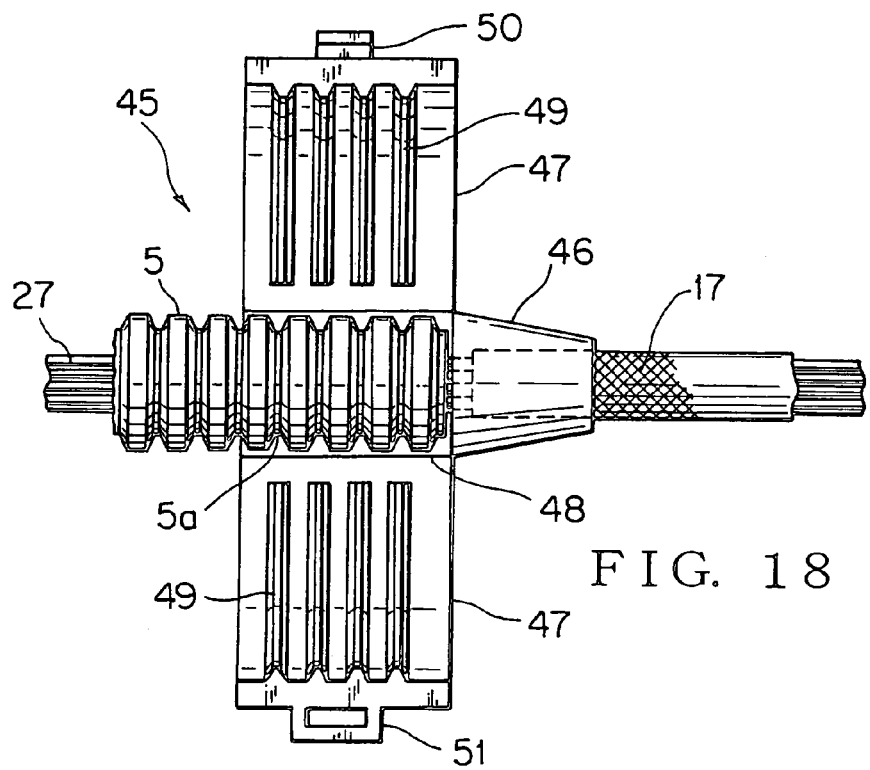
FIG. 18 is a plan view, showing unengaged condition of the connecting member in FIG. 17.

As shown in FIG. 18, the fixing member 45 is formed integrally with a mesh tube fixing portion 46 and a corrugated tube fixing portion 47. The corrugated tube fixing portion 47 is divided half in a radial direction to two pieces and formed to open and close freely through a hinge 48. An inner surface thereof has a projecting line 49 engaged with a concave groove 5a of the corrugated tube. The fixing member 45 is locked with each other by lock means such as a lock hook 50 and a lock piece 51. FIG. 17 shows the fixing portion 47 having an inner surface corresponding to the corrugated tube 5 with an oval cross section. A fixing portion having a round inner surface corresponding to a corrugated tube with a round cross section can be formed. The fixing member 45 can connect protecting tubes having different type and diameter easily and securely. Thereby, the continuous electric power supply device can be assembled more easily.

The structure for connecting in FIG. 17, 18 can be applied not only for power supply structure by using the above elastic member 6, 24, 32, but also for any case of connecting two protecting tubes with different type and material. In the structure for connecting, one tube 17 is fixed to one part 46 of the fixing member 45 integrally or by separated parts, and the other tube 5 is held or clamped by the other part 47 of the fixing member 45.

Instead of the protector 2 in the aforesaid embodiments, a recess area of the slide door and a cover corresponding to the recess can be used or a vehicle body may perform as the cover.

While the forms of the invention herein disclosed constitute presently preferred embodiments, many others are possible. It is not intended herein to mention all the possible embodiments of the invention which will be apparent to those skilled in the art. It is understood that the term used herein are merely descriptive rather than limiting, in that various changes may be made without departing from the scope of this invention as defined by the following claims.

What is claimed is:

1. A continuous electric power supply device for a door of a vehicle comprising:
a wire harness being formed into a loop shape when the door is closed, partially opened and fully opened;
an elastic member being disposed along a loop portion of the wire harness;
whereby the loop portion is energized in an expansive radial direction by the elastic member;
a protector in which the loop portion and elastic member are disposed, the protector having a wire harness leading portion to which the wire harness is fixed, and a long opening as another wire harness leading portion; and
a guide roller that positions the loop portion of the wire harness always at one end of the protector and maintains the loop portion in a substantially round shape.

2. The continuous electric power supply device according to claim 1, wherein the protector includes a guide portion for supporting the loop portion disposed at an opposite side of the opening.

3. The continuous electric power supply device according to claim 2, wherein the protector is provided with a guide wall separating the loop portion and a harness portion continued to the loop portion.

4. The continuous electric power supply device according to claim 1, wherein the elastic member is a flat spring disposed along an inner surface of the loop portion, and a major portion of the flat spring is in contact with the inner surface of the loop portion.

5. The continuous electric power supply device according to claim 4, wherein the flat spring has a length such that the wire harness is formed in a loop shape with an intersection.

6. The continuous electric power supply device according to claim 1, wherein the elastic member is a coil spring and the loop portion is inserted through an inside of the coil spring.

7. The continuous electric power supply device according to claim 6, wherein a bottom end of the coil spring is fixed, at a fixed side of the loop portion, on the loop portion or the protector, and a top end of the coil spring is fixed on the protector at a moving side of the loop portion to be slidable against the loop portion.

8. The continuous electric power supply device according to claim 7, wherein the coil spring is provided at the top end thereof with a cylindrical harness guide.

9. The continuous electric power supply device according to claim 8, wherein the coil spring is formed to have a smaller diameter toward the topside thereof for contacting with the loop portion so as to bend the loop portion with a large radius.

10. The continuous electric power supply device according to claim 1, wherein the elastic member is a spiral spring disposed inside the loop portion.

11. The continuous electric power supply device according to claim 10, wherein the spiral spring is turned from a center area of the loop portion to a direction to lead out the wire harness.

12. The continuous electric power supply device according to claim 11, wherein a center side end of the spiral spring is fixed on the protector, and a top end of the spiral spring is fixed on the loop portion.

13. The continuous electric power supply device according to claim 12, wherein the center side end of the spiral spring is formed into an asymmetric convexo-concave shape for preventing from assembling the spiral spring oppositely on the protector.

14. The continuous electric power supply device according to claim 13, wherein the top end of the spiral spring is fixed through a fixing member on the loop portion.

15. The continuous electric power supply device according to claim 1, wherein a protecting tube at the loop portion and a protection tube at lead-out side of the wire harness are connected together through a connecting member.

16. The continuous electric power supply device according to claim 14, wherein a protecting tube at the loop portion and a protection tube at lead-out side of the wire harness are connected together through a connecting member.

* * * * *